(12) United States Patent
Nakada et al.

(10) Patent No.: US 8,515,225 B2
(45) Date of Patent: Aug. 20, 2013

(54) OPTICAL DEVICE, METHOD FOR MANUFACTURING THE SAME AND OPTICAL INTEGRATED DEVICE USING THE SAME

(75) Inventors: Masafumi Nakada, Tokyo (JP); Takanori Shimizu, Tokyo (JP); Nobuo Suzuki, Kamakura (JP)

(73) Assignees: NEC Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 264 days.

(21) Appl. No.: 12/920,449

(22) PCT Filed: Mar. 3, 2009

(86) PCT No.: PCT/JP2009/054373
§ 371 (c)(1),
(2), (4) Date: Aug. 31, 2010

(87) PCT Pub. No.: WO2009/113469
PCT Pub. Date: Sep. 17, 2009

(65) Prior Publication Data
US 2011/0002578 A1   Jan. 6, 2011

(30) Foreign Application Priority Data
Mar. 13, 2008   (JP) .................................. 2008-064186

(51) Int. Cl.
*G02B 6/42* (2006.01)

(52) U.S. Cl.
USPC ............................................. 385/39; 385/32

(58) Field of Classification Search
USPC .................................................... 385/32, 39
See application file for complete search history.

(56) References Cited

U.S. PATENT DOCUMENTS

| 6,311,004 | B1 * | 10/2001 | Kenney et al. ................. 385/130 |
| 6,870,998 | B2 * | 3/2005 | Diemeer et al. ............... 385/140 |
| 7,043,134 | B2 * | 5/2006 | Berini et al. ................... 385/147 |
| 2002/0076149 | A1 * | 6/2002 | Deacon ............................ 385/27 |
| 2004/0208421 | A1 * | 10/2004 | Kitagawa ......................... 385/16 |

(Continued)

FOREIGN PATENT DOCUMENTS

| JP | 61-11728 | * | 1/1986 |
| JP | 63-256928 | A | 10/1988 |

(Continued)

OTHER PUBLICATIONS

K. D. Preston, et al., "Comparison of electro-optic lead-lanthanum zirconate titanate films on crystalline and glass substrates," Applied Physics Letters, Jun. 8, 1992, pp. 2831-2833, vol. 60, No. 23.

K. Nashimoto, et al., "Patterning of (Pb, La) (Zr, Ti)$O_3$ waveguides for fabricating micro-optics using wet etching and solid-phase epitaxy," Applied Physics Letters, Aug. 23, 1999, pp. 1054-1056, vol. 75, No. 8.

(Continued)

*Primary Examiner* — Charlie Peng
(74) *Attorney, Agent, or Firm* — Sughrue Mion, PLLC (57) ABSTRACT

Provided is an optical device that includes a ring-shaped optical waveguide and an input/output optical waveguide, and that changes a resonant wavelength of the ring-shaped optical waveguide, in which the ring-shaped optical waveguide includes in part a refractive index control section for controlling a refractive index at a guided wavelength, and the refractive index control section is formed of an optical material having a thermo-optic effect with its sign different from that of an optical material that forms a section of the ring-shaped optical waveguide other than the refractive index control section.

9 Claims, 7 Drawing Sheets

(56) References Cited

U.S. PATENT DOCUMENTS

| | | | |
|---|---|---|---|
| 2005/0147343 A1 | 7/2005 | Nakada et al. | |
| 2006/0050752 A1 | 3/2006 | Nunoya et al. | |
| 2006/0078254 A1* | 4/2006 | Djordjev et al. | 385/32 |
| 2009/0122300 A1* | 5/2009 | Wu et al. | 356/128 |

FOREIGN PATENT DOCUMENTS

| | | |
|---|---|---|
| JP | 02-074909 A | 3/1990 |
| JP | 2005-181995 A | 7/2005 |
| JP | 2006-222305 A | 8/2006 |
| JP | 2006-243326 A | 9/2006 |
| JP | 2007-212787 A | 8/2007 |
| WO | 2004/088802 A1 | 10/2004 |

OTHER PUBLICATIONS

Ansheng Liu, et al., "High-speed optical modulation based on carrier depletion in a silicon waveguide," Optics Express, Jan. 22, 2007, pp. 660-668, vol. 15, No. 2.

Yasuo Kokubun, et al., "Athermal Narrow-Band Optical Filter at 1.55 µm Wavelength by Silica-Based Athermal Waveguide," IEICE Trans. Electron., Aug. 1998, pp. 1187-1194, vol. E81-C, No. 8.

H. Tanobe, et al., "A Temperature Insensitive InGaAsp-InP Optical Filter," IEEE Photonics Technology Letters, Nov. 1996, pp. 1489-1491, vol. 8, No. 11.

Y. Inoue, et al., "Athermal silica-based arrayed-waveguide grating multiplexer," Electronics Letters, Nov. 6, 1997, pp. 1945-1947, vol. 33, No. 23.

* cited by examiner

OPTICAL DEVICE, METHOD FOR MANUFACTURING THE SAME AND OPTICAL INTEGRATED DEVICE USING THE SAME

CROSS REFERENCE TO RELATED APPLICATIONS

This application is a National Stage of International Application No. PCT/JP2009/054373, filed on Mar. 3, 2009, which claims priority from Japanese Patent Application No. 2008-064186, filed on Mar. 13, 2008, the contents of all of which are incorporated herein by reference in their entirety.

TECHNICAL FIELD

This invention relates to an optical device used for optical communication, optical interconnection, optical storage, and the like, and also to an optical integrated device including the same, and a manufacturing method therefor.

BACKGROUND ART

An electro-optic effect, in which a refractive index changes because of interaction between an electric field and a substance, provides a high-speed characteristic, a power-saving characteristic due to voltage drive, and structural simplicity, and therefore is applied to an optical modulator.

An optical modulator using $LiNbO_3$ is structured by forming a Mach-Zender waveguide on a monocrystalline $LiNbO_3$ substrate by a Ti diffusion method, and then combining electrodes therewith. This optical modulator changes a refractive index of the waveguide by applying a voltage, to thereby control ON/OFF of an optical signal. However, such an optical modulator is expensive because the monocrystalline substrate is necessary. Further, this optical modulator has a small electro-optic effect of $LiNbO_3$ and has a planar electrode structure. Hence, a long waveguide is necessary, which greatly increases an element size to the scale of cm.

$Pb_{1-x}La_x(Zr_yTi_{1-y})O_3$ (PLZT), which is transparent ceramic, has an electro-optic coefficient larger by approximately two digits than that of monocrystalline $LiNbO_3$ used for the current optical modulator. Therefore, the use of PLZT raises expectations for a small-sized optical element, and higher cost efficiency, higher power efficiency, and higher speed due to the downsizing, and hence formation of a thin film of PLZT by a sol-gel method has been studied thus far (Non-patent Document 1 and Non-patent Document 2).

As an innovative technology expected in the future, a silicon photonic device that enables optic and electronic integration on one chip has been studied. When this technology is realized, an LSI such as a CPU and a memory, and an active optical element such as an optical switch may be formed on the same substrate, which leads to a higher-speed performance of the LSI. In addition, an inexpensive optical device may be attained because an LSI manufacturing technology may be applied to a manufacturing process for the optical communication device.

However, silicon is an indirect transition semiconductor, which makes it difficult to form a light-emitting element such as a laser device directly on a silicon substrate. Therefore, it is important to form an optical modulator for converting an electric signal into an optical signal on the silicon substrate. It is demanded that the optical modulator for LSI optical interconnection be driven at low voltage under LSI operating conditions, have high power efficiency, and be small.

As an optical modulator satisfying the demand, a ring resonator type structured by using silicon has been studied (Non-patent Document 3). The silicon-ring resonator changes a refractive index by injecting a carrier into a waveguide layer of light, and changes a resonant wavelength, to thereby perform modulation operation.

Non-patent Document 1: K. D. Preston and G. H. Haertling: Appl. Phys. Lett. 60 (1992) 2831.

Non-patent Document 2: K. Nashimoto, K. Haga, M. Watanabe, S. Nakamura and E. Osakabe: Appl. Phys. Lett. 75 (1999) 1054.

Non-patent Document 3: A. Liu, L. Liao, D. Rubin, H. Nguyen, B. Ciftcioglu, Y. Chetrit, N. Izhaky, M. Paniccia: Opt. Exp., 15 (2007) 660.

Non-patent Document 4: Yasuo Kokubun, Shigeru Yoneda, and Shinnosuke Matsuura: IEICE Trans. Electron. Vol. E81-C, No. 8 (1998) 1187.

Non-patent Document 5: H. Tanobe, Y. Kondo, H. Yasaka and Y. Yoshikuni: IEEE Photo. Technol. Lett. Vol. 8, No. 11, (1996) 1489.

Non-patent Document 6: Y. Inoue, A. Kaneko, F. Hanawa, H. Takahashi, K. Hattori and S. Sumida: Electron. Lett. Vol. 33, No. 23, (1997) 1945.

DISCLOSURE OF THE INVENTION

It has been considered that the ring resonator type, which is driven at low voltage under the LSI operating conditions, has high power efficiency, and is small, is the most suitable for the optical modulator for LSI optical interconnection. The operation principle of the ring resonator is as follows. A laser beam (CW light beam) having a wavelength corresponding to a resonant wavelength of the ring resonator is allowed to enter the ring resonator. When the incident wavelength matches with the resonant wavelength, the incident light resonates in a ring waveguide, and hence a quantity of light that exits from an output side of an input/output optical waveguide becomes extremely small. Then, an electric signal is applied to a refractive index control section for controlling a refractive index at a guided wavelength, to thereby change the resonant wavelength. At this time, the resonant wavelength and the wavelength of the laser beam do not match with each other, and hence the quantity of output light becomes larger. The ring resonator performs the modulation operation in this manner. However, a fluctuation in device temperature induces a change in resonant wavelength of the ring waveguide, with the result that the modulation operation of the ring resonator becomes unstable.

This is because the change in refractive index induced by the temperature fluctuation, that is, a thermo-optic effect, causes the resonant wavelength determined based on an optical path length of the ring to fluctuate. When the resonant wavelength fluctuates due to the temperature, the fluctuation induces an extinction ratio to drop, which leads to a significant decline in function of the device. In view of this, in the field of optical communication, a temperature stabilization mechanism such as a Peltier element is added to the modulator. The modulator using the ring resonator therefore has a problem of a high price, a large size, and low power efficiency.

In order to solve the problem inherent in the ring resonator, there is proposed a temperature-independent ring resonator structure in which temperature coefficients dn/dT of refractive indices of the core material and the cladding material are set to have signs that are opposite to each other (Non-patent Document 4). In this structure, dn/dT of $TiO_2$—$SiO_2$ used as the core material is positive while dn/dT of PMMA-TFMA used as the cladding material is negative. As described above, the structure in which the change in refractive index induced by temperature is compensated is adopted.

However, in order to achieve temperature compensation by setting different signs in the thermo-optic effects of the core material and the cladding material, it is necessary to allow a large quantity of guided light to be transmitted into the cladding. The waveguide having a large quantity of transmitted light is inevitably week in light confinement, and reduction in ring diameter leads to an increased radiation loss. For those reasons, it is difficult to downsize the ring resonator and hence difficult to manufacture an integrated device. Further, the ring resonator necessitates larger power for modulation, which hinders high-speed performance.

As a temperature-independent optical device structure, there is proposed a structure of an optical filter having a Mach-Zender waveguide, in which two waveguides are formed of materials different in thermo-optic effects of effective refractive indices, and are different in lengths (Non-patent Document 5). This structure is effective in the case of the Mach-Zender type, but is not effective in the case of the resonator type.

Further, as the temperature-independent optical device structure, there is proposed a structure of an arrayed-waveguide grating (AWG), in which a groove is formed in part of an arrayed waveguide and silicone is filled therein, the silicone having a thermo-optic effect of a refractive index with its sign opposite to that of silica that forms the arrayed waveguide (Non-patent Document 6). In this structure, a waveguide loss increases in a case of a ring structure having a small curvature radius of the waveguide.

This invention has been made in view of the above-mentioned circumstances, and it is therefore an object thereof to provide a resonant optical device that is small in characteristic fluctuation induced by temperature, in particular, to provide a small-sized, power-saved, high-speed, inexpensive optical device. Another object of this invention is to provide an optical integrated device including the optical device.

According to an aspect of this invention, there is provided an optical device including an optical waveguide having a resonance structure, in which: a first section that constitutes at least part of the optical waveguide includes a core layer connected to a core layer of a second section of the optical waveguide, which joins with the first section along a light traveling direction; and an optical material that forms at least part of the core layer of the first section, and a second optical material that forms at least part of the core layer of the second section have thermo-optic effects with their signs different from each other.

Further, according to another aspect of this invention, there is provided an optical device that includes a ring-shaped optical waveguide and an input/output optical waveguide, and that changes a resonant wavelength of the ring-shaped optical waveguide, in which the ring-shaped optical waveguide includes in part a refractive index control section for controlling a refractive index at a guided wavelength, and the refractive index control section contains an optical material having a thermo-optic effect with its sign different from that of a thermo-optic effect of an optical material used for a section of the ring-shaped optical waveguide other than the refractive index control section.

Further, according to still another aspect of this invention, there is provided a manufacturing method for the above-mentioned optical device, including a step of forming at least part of the refractive index control section by depositing an optical material by an aerosol deposition method.

According to this invention, the resonant optical device that is small in characteristic fluctuation induced by temperature, in particular, the power-saved, inexpensive optical device can be obtained. Further, the optical integrated device including the optical device can be obtained.

BEST MODE FOR EMBODYING THE INVENTION

An optical device according to an exemplary embodiment of this invention is an optical device that includes a ring-shaped optical waveguide and an input/output optical waveguide, and that changes a resonant wavelength of the ring-shaped optical waveguide, in which the ring-shaped optical waveguide includes in part a refractive index control section for controlling a refractive index at a guided wavelength. In the ring-shaped optical waveguide, a core portion of the refractive index control section is formed of an optical material having a thermo-optic effect with its sign different from that of a thermo-optic effect of an optical material that forms a core portion of a section other than the refractive index control section. As described above, when the core portions of the refractive index control section and the other optical waveguide section are formed of different materials in the ring-shaped optical waveguide, an inexpensive, power-saved optical modulator that is small in characteristic fluctuation induced by temperature is attained.

Hereinbelow, description is given of this embodiment in which simulation is performed.

Figure 1:
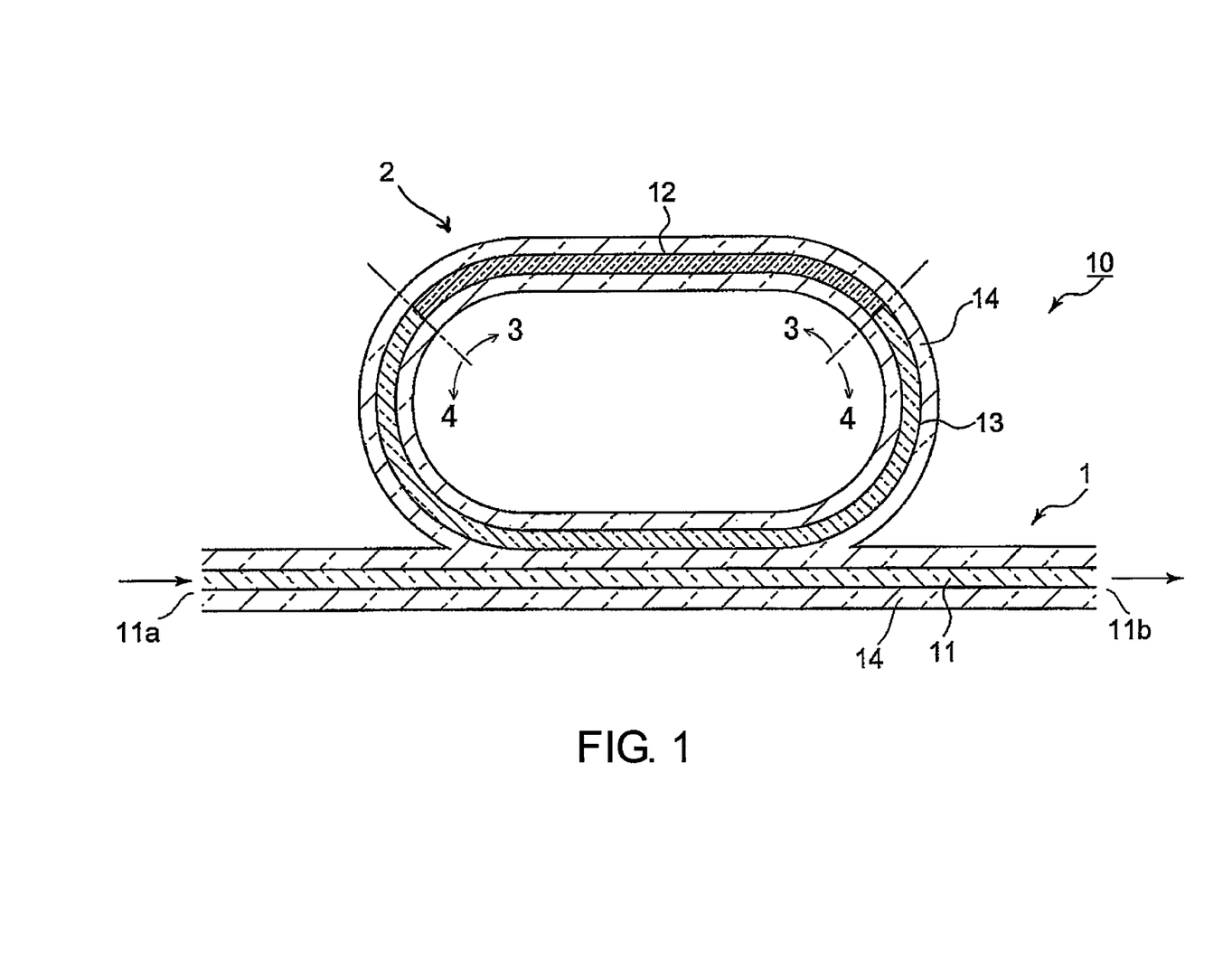
FIG. 1 is a schematic view of a ring resonant modulator according to an exemplary embodiment of this invention.

FIG. 1 is a schematic view of a ring resonant modulator according to the embodiment of this invention. A ring resonant modulator 10 includes an input/output optical waveguide 1 and an elliptical, ring-shaped optical waveguide 2. The ring-shaped optical waveguide 2 includes a refractive index control section 3 serving as a section capable of controlling a refractive index, and an optical waveguide section 4 other than the refractive index control section 3.

The input/output optical waveguide 1 includes, in the center thereof, a first core portion 11 formed of a core layer, and a cladding portion 14 provided in the periphery thereof.

A light beam to be guided is input at one end portion 11a and output at another end portion 11b. A second core portion 12 formed of a core layer is provided in the center of the refractive index control section 3 of the ring-shaped optical waveguide 2, which serves as the section capable of controlling a refractive index, and the cladding portion 14 is provided in the periphery thereof. Further, a third core portion 13 formed of a core layer is provided in the center of the optical waveguide section 4 other than the refractive index control section 3, and the cladding portion 14 covers the periphery thereof.

A refractive index of the second core portion 12 of the refractive index control section 3 has a temperature coefficient with its sign opposite to that of a temperature coefficient of the third core portion 13 of the optical waveguide section 4 that is a section of the ring-shaped optical waveguide 2 other than the refractive index control section 3.

The third core portion 13 of the ring-shaped optical waveguide 2 is formed of the same material as the material that forms the first core portion 11 of the input/output optical waveguide 1.

Using a finite element method, calculation is performed in a TE basic mode for each of the refractive index control section 3 and the optical waveguide section 4 of the ring-shaped optical waveguide 2. It is assumed that the second core portion 12 of the refractive index control section 3 contains PLZT $((Pb_{0.95}La_{0.05})(Zr_{0.3}Ti_{0.7})O_3)$ serving as an electro-optic material, the third core portion 13 of the section other than the refractive index control section 3 contains titanium oxide $TiO_2$, and the cladding portion 14 provided in the periphery of each of the core portions 12 and 13 contains $SiO_2$.

Table 1 below shows temperature dependence of the refractive index of each material used in the calculation. A temperature coefficient dn/dT of the refractive index of PLZT is positive while dn/dT of $TiO_2$ is negative, which means that the signs are different from each other.

TABLE 1

Temperature dependence of refractive index of each material

| Material | n (20° C.) | n (100° C.) | dn/dT (K − 1) |
|---|---|---|---|
| PLZT | 2.4 | 2.408 | $+10 \times 10^{-5}$ |
| TiO2 | 2.2 | 2.1952 | $-6 \times 10^{-5}$ |
| SiO2 | 1.444388 | 1.445188 | $+1 \times 10^{-5}$ |

Figure 2A:
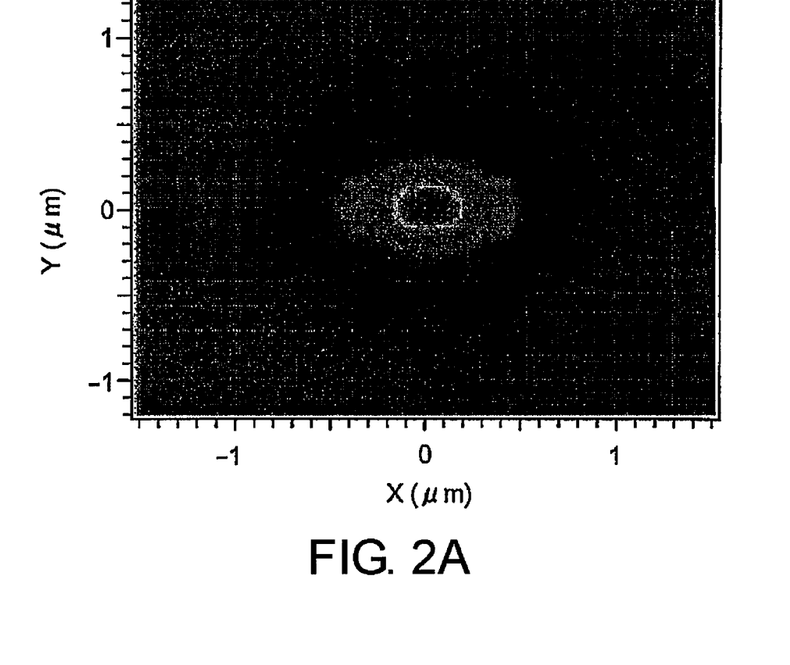
FIG. 2A is a diagram illustrating a calculation result of an electric field distribution in a TE basic mode for a refractive index control section of the ring resonant modulator, which includes a PLZT core portion.
Figure 2B:
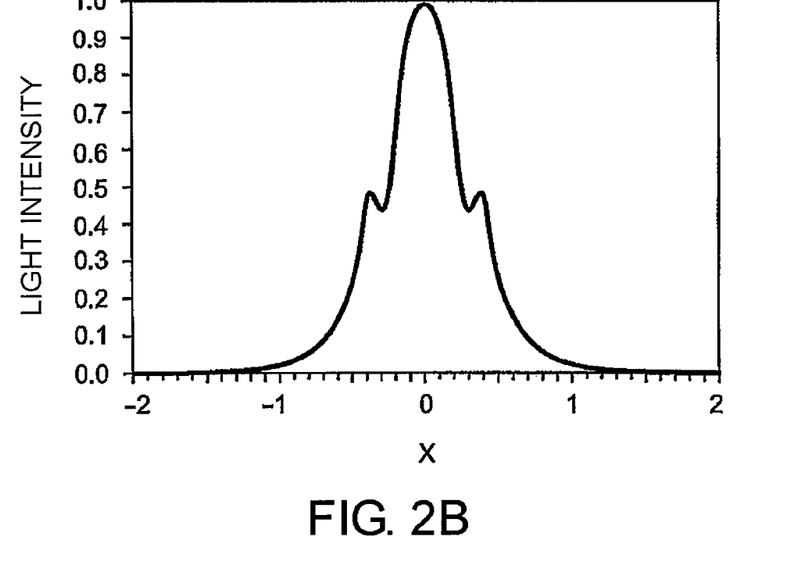
FIG. 2B is a graph illustrating the electric field distribution in a width direction thereof.

FIGS. 2A and 2B each illustrate a calculation result of an electric field distribution in the TE basic mode for the refractive index control section 3. The wavelength is set to 1,550 nm. FIG. 2A illustrates an electric field distribution obtained when the PLZT core is formed as a channel waveguide having a height of 300 nm and a width of 700 nm. FIG. 2B is a graph illustrating the electric field distribution in a width direction. As an effective refractive index $n_{eff}$ at this time, 1.780116 is obtained.

Figure 3A:
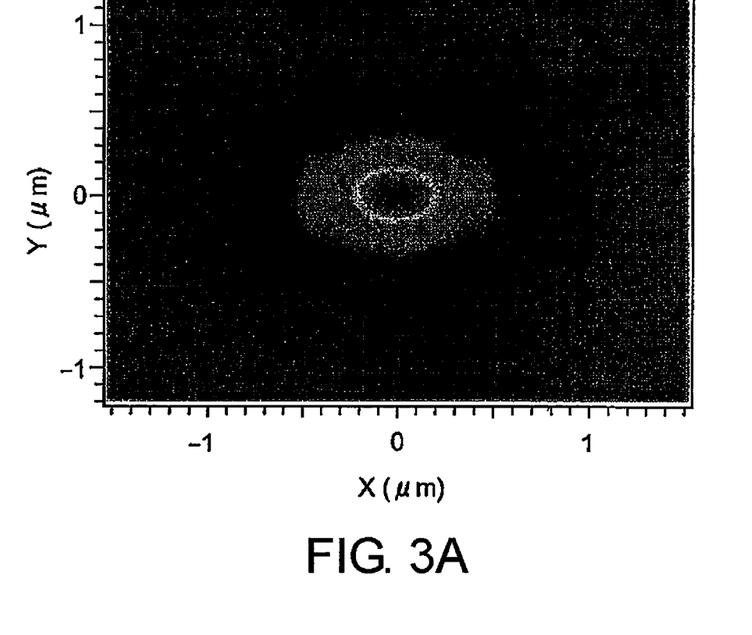
FIG. 3A is a diagram illustrating a calculation result in the TE basic mode for an optical waveguide of the ring resonant modulator, which includes a $TiO_2$ core portion.
Figure 3B:
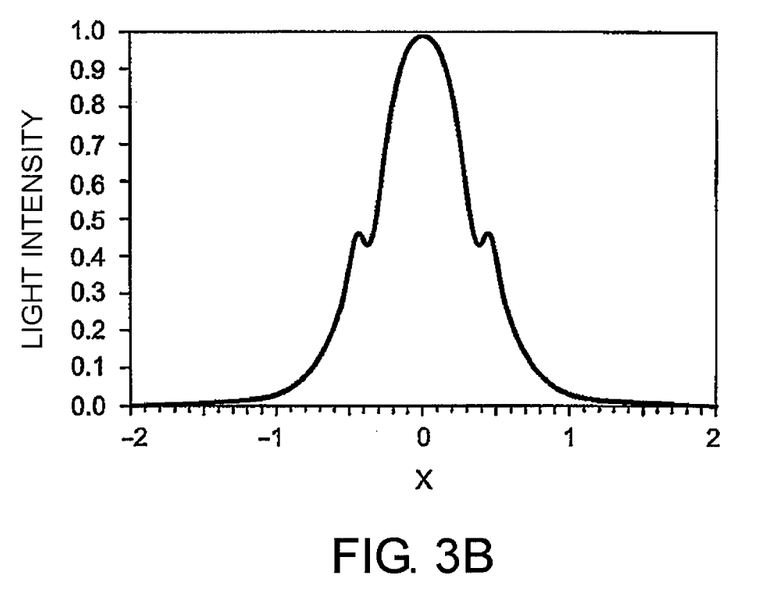
FIG. 3B is a graph illustrating an electric field distribution in a width direction thereof.

FIGS. 3A and 3B each illustrate a calculation result of an electric field distribution in the TE basic mode for the optical waveguide section 4 of the ring-shaped optical waveguide 2. Similarly to the above, the wavelength is set to 1,550 nm. FIG. 3A illustrates an electric field distribution obtained when the $TiO_2$ core is formed as a channel waveguide having a height of 400 nm and a width of 800 nm, and FIG. 3B illustrates the electric field distribution in a width direction. The effective refractive index $n_{eff}$ at this time is 1.753276. It should be noted that, from the viewpoint of single mode conditions and effective refractive index matching, the cross section of the PLZT core is set smaller than that of the $TiO_2$ core.

Next, description is given of calculation results of waveguide characteristics obtained in a case where a ring radius is set to 10 μm. It is assumed that the PLZT portion has a loss of 5 dB/mm while the $TiO_2$ portion has a loss of 1 dB/mm. The waveguide lengths of the PLZT portion and the $TiO_2$ portion are adjusted to 29.48 μm and 53.34 μm, respectively, so as to eliminate the temperature dependence. A coupling ratio of a directional coupler is adjusted so that the resonance becomes the strongest (so-called critical coupling).

Table 2 below shows the assumed losses and calculation results of power transmittances.

TABLE 2

Assumed losses and calculation results of power transmittances

| | Loss per length [dB/mm] | Waveguide length [μm] | Loss [dB] | Power transmittance | Electric field transmittance |
|---|---|---|---|---|---|
| PLZT portion | 5 | 29.48 | 0.1474 | 0.9666 | 0.9832 |
| TiO2 portion | 1 | 53.34 | 0.0533 | 0.9878 | 0.9939 |
| Perimeter | | 82.83 | 0.2008 | 0.9548 | 0.97715 |

Figure 4:
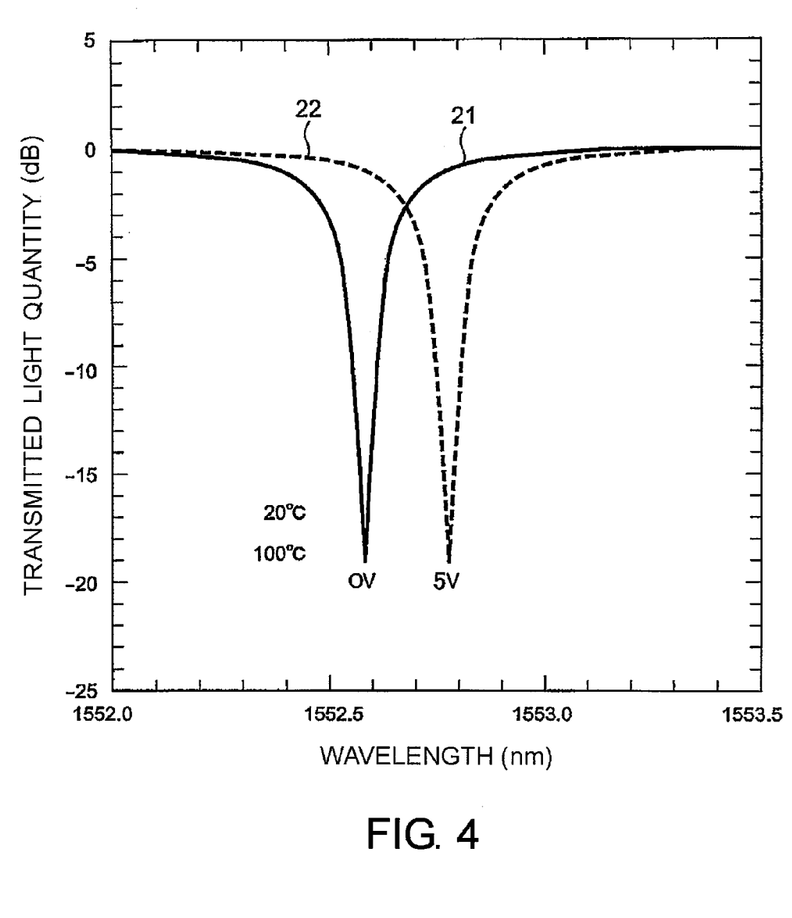
FIG. 4 is a graph illustrating calculation results of wavelength spectra with respect to a transmitted light quantity in the ring resonant modulator.

FIG. 4 is a graph illustrating calculation results of wavelength spectra with respect to a transmitted light quantity in the ring resonant modulator 10 according to this invention. In FIG. 4, a solid line 21 represents a transmitted light quantity spectrum at a voltage of 0 V applied to the PLZT waveguide, which corresponds to the refractive index control section 3, while a broken line 22 represents a transmitted light quantity spectrum at 5 V applied thereto. The unit dB is used for expressing the transmitted light quantity. PLZT serving as an electro-optic material is set to have a value $2 \times 10^{-4} V^{-1}$ as a refractive index change amount dn/dV induced by the applied voltage, based on the waveguide and electrode structures. It is found that the resonant wavelength of 1,552.5 nm at 0 V is shifted to the high-wavelength side by approximately 0.2 nm at the applied voltage of 5 V. This result shows that, at the voltage of 5 V, modulation is possible with a loss of 1 dB and at an extinction ratio of 18 dB. Further, the calculation results obtained at room temperature (20° C.) and at 100° C. turn out to be substantially equivalent.

As described above, in the optical device that includes the ring-shaped optical waveguide 2 and the input/output optical waveguide 1, and that changes the resonant wavelength of the ring-shaped optical waveguide 2, the ring-shaped optical waveguide 2 includes in part the refractive index control section 3 for controlling the refractive index at the guided wavelength, and the core portion of the refractive index control section 3 is formed of the optical material having the thermo-optic effect with its sign different from that of the thermo-optic effect of the optical material that forms the core portion of the optical waveguide section 4 of the ring-shaped optical waveguide other than the refractive index control section 3. Accordingly, it is apparent that the ring resonant modulator 10 that is small in characteristic fluctuation induced by temperature and is driven at low voltage can be attained. Utilizing this result, it is possible to manufacture a high-performance, inexpensive optical device and optical integrated device.

The calculation results are herein shown in the case of the ring-shaped optical waveguide 2, but a similar effect can obviously be obtained in a case of other resonant optical waveguide devices such as a Fabry-Perot optical waveguide device.

Further, the calculation results are shown in the case of the ring waveguide having the channel structure, but a similar effect can obviously be obtained in a case of other different waveguide structures such as a ridge structure and a reverse ridge structure.

In the optical device having the above-mentioned structure according to this embodiment, the core portion of the refractive index control section 3 of the ring-shaped optical waveguide 2 is formed of the optical material having a thermo-optic effect with its sign different from that of a thermo-optic effect of the optical material of the core portion of the optical waveguide section 4 of the ring-shaped optical waveguide 2 other than the refractive index control section 3. It is desired that the optical material used for the core portion of the refractive index control section 3 have a high refractive index changeability induced by voltage or the like, and have a small thermo-optic effect. The high refractive index changeability is important in a case where operation characteristics such as the extinction ratio are weighted, but in this case, it is difficult to select a material that has a high refractive index changeability and has a sufficiently small thermo-optic effect. Even in a case where an optical material that has a high refractive index changeability but does not have a sufficiently small thermo-optic effect is used for the core portion of the refractive index control section 3, it is possible to manufacture an optical device that is small in characteristic fluctuation induced by temperature and is large in extinction ratio, when the optical material having the thermo-optic effect with its sign different from that of the thermo-optic effect of the optical material that forms the refractive index control section 3 is used for the core portion of the optical waveguide section 4 of the ring-shaped optical waveguide other than the refractive index control section 3.

Further, in the ring-shaped optical waveguide 2, the effective lengths, refractive indices, and structures of the refractive index control section 3 and the optical waveguide section 4 of the ring-shaped optical waveguide 2 other than the refractive index control section 3 can be set to have a relation in which a fluctuation in resonant wavelength induced by a temperature change is compensated. Accordingly, it is possible to manufacture the optical device that is small in characteristic fluctuation induced by temperature and is large in extinction ratio.

In the ring-shaped waveguide 2, a ratio between optical path lengths of the refractive index control section 3 and the other optical waveguide section 4 (refractive index control section 3/other optical waveguide section 4) is preferably 1/10 or larger, more preferably 1/8 or larger, and further preferably 1/7 or larger, from the viewpoint of obtaining sufficient operation characteristics such as the extinction ratio. Meanwhile, the ratio between the optical path lengths of the refractive index control section 3 and the other optical waveguide section 4 is preferably 1/0.5 or smaller, more preferably 1/0.8 or smaller, and further preferably 1/1 or smaller, from the viewpoint of sufficiently suppressing the characteristic fluctuation induced by temperature.

Moreover, in the ring-shaped waveguide 2, the temperature coefficients dn/dT of the refractive indices of the core portion of the refractive index control section 3 and the core portion of the other optical waveguide section 4 are different in their signs, and a ratio between their absolute values (refractive index control section 3/other optical waveguide section 4) is preferably 1/10 or larger and 10 or smaller, more preferably 1/8 or larger and 8 or smaller, and further preferably 1/7 or larger and 7 or smaller, from the viewpoint of sufficiently suppressing the characteristic fluctuation induced by temperature.

The core portion of the refractive index control section 3 may be formed of the electro-optic material. Accordingly, it is possible to manufacture a high-speed, power-saved optical device such as the optical modulator. Examples of the electro-optic material include lead zirconate titanate and lanthanum-doped lead zirconate titanate. As the electro-optic material, lead zirconate titanate represented by $Pb_{1-x}La_x(Zr_yTi_{1-y})O_3$ ($0 \leq x < 1$, $0 < y < 1$) may be used suitably (when x=0, "PZT", and when 0<x, "PLZT"). By using such a material, it becomes possible to manufacture a small-sized active element or device such as the optical modulator, which is driven at low voltage.

The core portion of the optical waveguide section 4 of the ring-shaped optical waveguide 2 other than the refractive index control section 3 may be formed of a material selected from $TiO_2$ and $PbMoO_4$. Any of the materials have a negative temperature coefficient dn/dT of the refractive index. Further, it is desired that the difference in refractive indices be small between the core portion of the refractive index control section 3 of the ring-shaped optical waveguide 2 and the core portions of the other optical waveguide section 4 of the ring-shaped optical waveguide 2 and the input/output waveguide 1, in terms of the characteristics of the optical device such as the modulator. In a case where the core portion of the refractive index control section 3 is formed of an electro-optic material having a refractive index of, for example, 2.2 to 2.5, it is desired that a similar refractive index be exhibited in the core portion of the optical waveguide section 4 of the ring-shaped waveguide 2 other than the refractive index control section 3. By using the above-mentioned optical material, it becomes possible to manufacture a high-performance optical device.

According to the above-mentioned embodiment of this invention, the ring-shaped optical waveguide 2 is provided with an electrode for forming an electric field, and the electrode is applied with an electric signal so that the optical device can operate as an optical modulator or an optical switch for controlling a light beam. Accordingly, it is possible to provide a small-sized or power-saved optical modulator or optical switch that is capable of quick response.

Further, according to the embodiment of this invention, it is possible to provide an optical integrated device including the above-mentioned optical device (first optical device) and another optical device (second optical device) on the same substrate. As the second device, any one of a laser device, an electro-optic converter, an opto-electric converter, an optical amplifier, an optical switch, and an optical filter is applicable. As the substrate, a silicon substrate may be used.

According to the embodiment of this invention, it is possible to provide an optical integrated device including the above-mentioned optical device and an electronic circuit on the same substrate. As the substrate, a silicon substrate may be used.

The optical device according to the embodiment of this invention can be manufactured by depositing the optical material that is to form the core portion of the refractive index control section 3 by an aerosol deposition method. With such a manufacturing method, it is possible to manufacture, on an arbitrary substrate such as an Si substrate, an optical device such as the optical modulator, which is small in characteristic fluctuation induced by temperature and is driven at low voltage, and an optical integrated device including the optical device.

EXAMPLE

Hereinbelow, this invention is further described by way of example.

Figure 5:
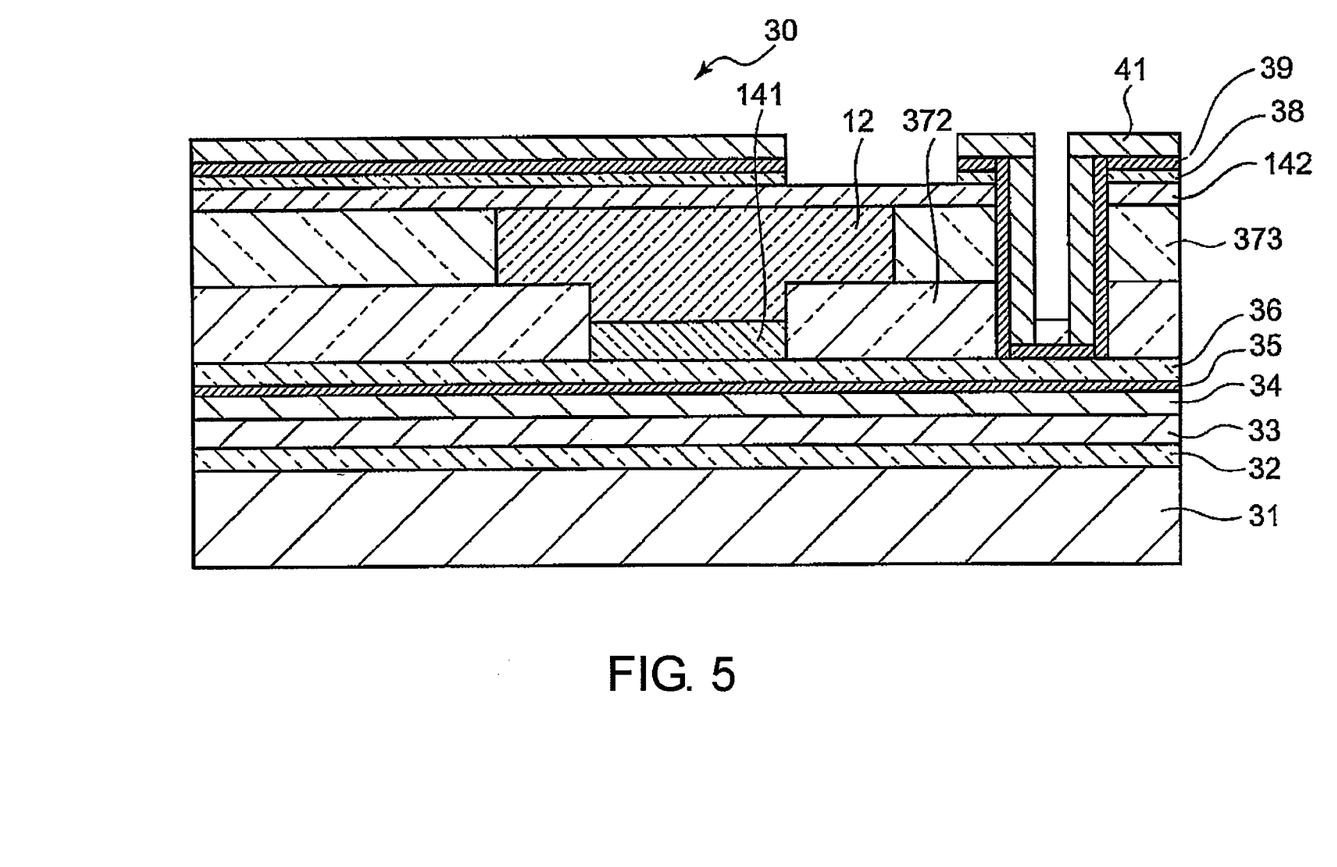
FIG. 5 is a schematic cross-sectional view illustrating the refractive index control section of an optical device according to an example of this invention.

FIG. 5 is a schematic cross-sectional view illustrating the refractive index control section 3 of the optical device according to the example of this invention. In this example, a reverse ridge structure was adopted as the waveguide structure. A schematic plan view of this optical device is similar to FIG. 1.

The ratio between the optical path lengths of the refractive index control section 3 and the other optical waveguide section 4 of the ring-shaped optical waveguide was set to 3:5. The perimeter of the ring-shaped waveguide 2 was 800 μm.

An $SiO_2$ layer 32 was formed on a silicon substrate 31, and then a Ti layer 33, an Au layer 34, and a Ti layer 35 were formed as a lower metal electrode by a DC magnetron sputtering method. An ITO layer was formed thereon as a lower transparent electrode layer 36 by the DC magnetron sputtering method (sputtering gas: Ar gas).

Next, an $SrTiO_3$ layer was formed as a cladding layer 141. Subsequently, the $SrTiO_3$ layer (cladding layer 141) was etched by an ion milling method.

Next, $SiO_2$ layers 372 and 373 were formed.

Next, a concave structure was formed, and a core layer (core portion 12) was formed by the aerosol deposition method so as to fill in the concave structure. A specific film formation method therefor is described later. Subsequently, after annealing in an atmosphere at 600° C. for 30 minutes, the surface of the resultant was polished to planarize the core layer.

An $SrTiO_3$ layer was thickly formed thereon as an upper cladding layer 142, and an ITO layer was subsequently formed as an upper transparent electrode layer 38. After that, a Ti layer 39 and an Au layer 41 were formed as an upper metal electrode. The upper cladding layer 142, the upper transparent electrode layer 38, and the upper metal electrode 39 and 41 were formed by the same formation method as that used for the lower structure.

Next, description is given of the formation method for the core layer by the above-mentioned aerosol deposition method.

Figure 6:
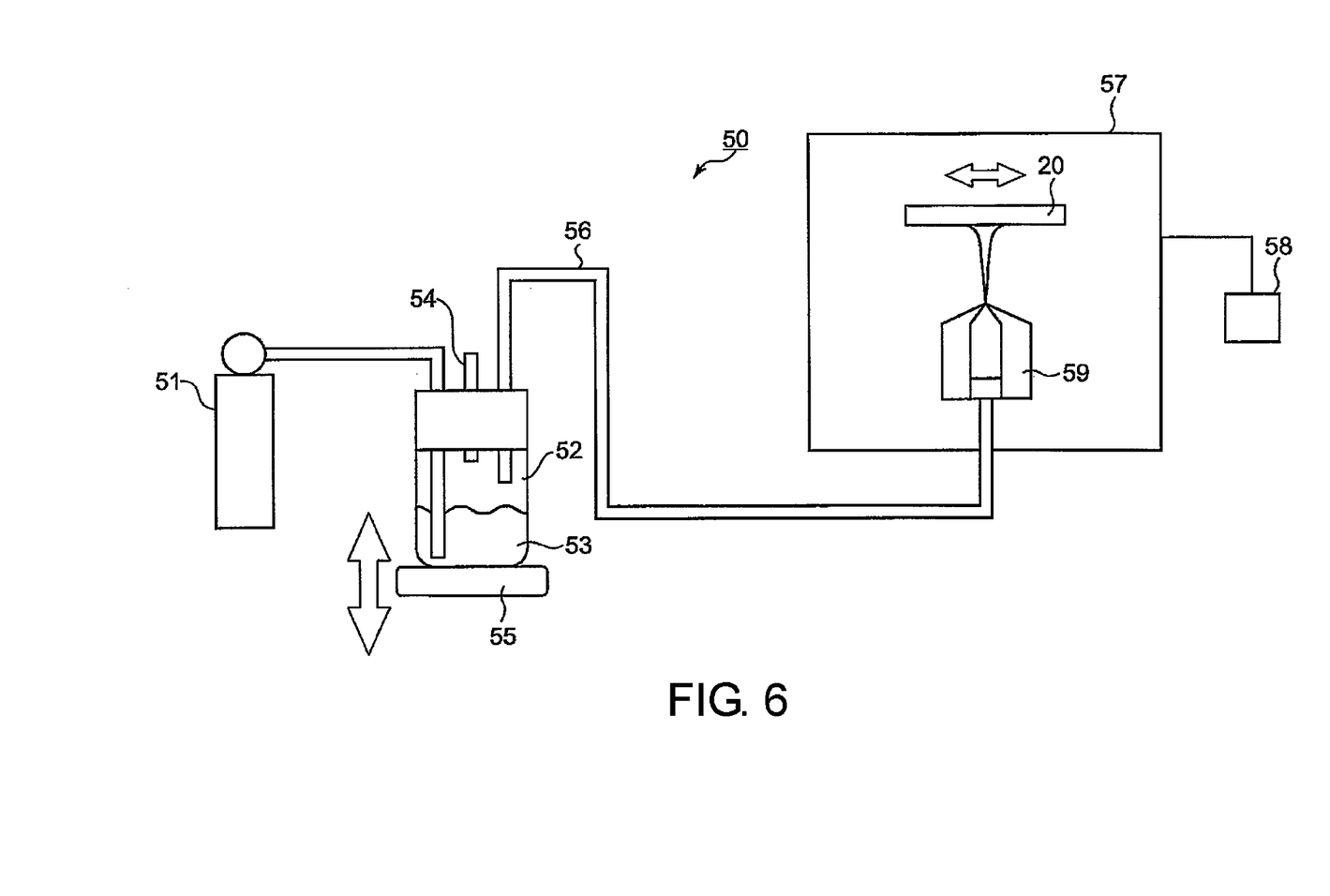
FIG. 6 is a schematic diagram of a film formation apparatus used in the example of this invention.

FIG. 6 is a schematic diagram of a film formation apparatus 50 used in this example.

A gas cylinder 51 that contains an oxygen gas is connected to a glass bottle 52 through a carrier pipe. A powder raw material 53 is inserted into the glass bottle 52, and the air inside the glass bottle 52 is evacuated by using an evacuation pipe 54 so that the glass bottle 52 becomes a vacuum of approximately 20 Torr (2.67 kPa) inside. After that, the oxygen gas is introduced as a carrier gas at a controlled flow rate. The glass bottle 52 is vibrated by a vibrator 55, and fine particles of raw powder are thus diffused in the gas, to thereby generate aerosol, which is contained in the carrier gas and carried through a carrier pipe 56 to a film formation chamber 57. The air inside the film formation chamber 57 is evacuated by a vacuum pump 58 so that the film formation chamber 57 has a predetermined degree of vacuum. The powder is sprayed from a nozzle 59 onto a substrate 20, to thereby form a thin film.

Film formation conditions are as follows. The carrier gas is oxygen, the incident angle of the substance (powder) discharged from the nozzle onto the surface of the substrate is 30 degrees, the gas flow rate is 12 l/minute, the film formation rate is 0.5 μm/minute, and the vibration per minute of the vibrator 55 is 166 rpm. A silicon substrate before the core formation is used as the substrate 20. Lanthanum-doped lead zirconate titanate (PLZT)-based powder, which is an oxide having a large electro-optic effect, is used as the film formation material. The composition of PLZT is $(Pb_{0.95}La_{0.05})(Zr_{0.3}Ti_{0.7})O_3$. The average particle diameter of the raw powder is set to 0.5 μm. The film thickness of PLZT is 2 μm. The PLZT-based powder serving as the film formation material has a composition of a ferroelectric having a perovskite crystal structure, and the composition is suitable for an optical device having a large primary electro-optic coefficient.

Figure 7:
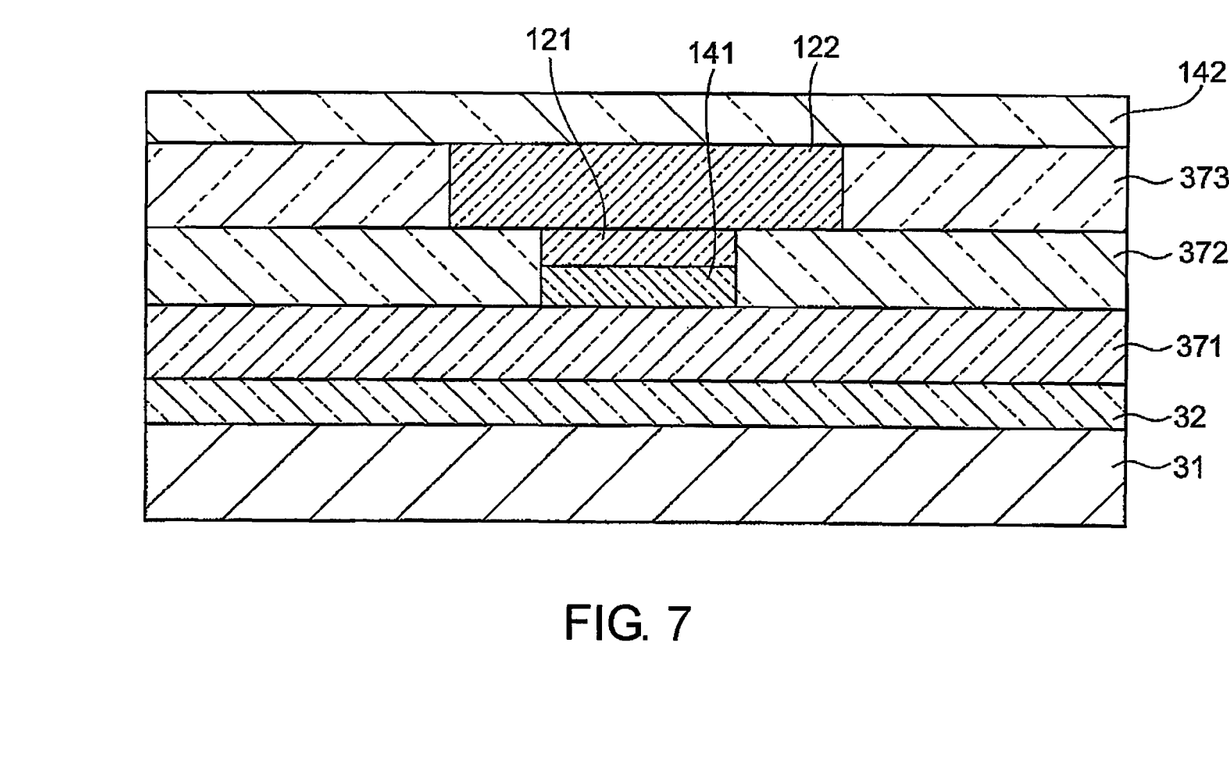
FIG. 7 is a schematic cross-sectional view illustrating an optical waveguide section of a ring-shaped waveguide of the optical device other than the refractive index control section according to the example of this invention.

FIG. 7 is a schematic cross-sectional view illustrating the optical waveguide section 4 of the ring-shaped waveguide 2 other than the refractive index control section 3 of the optical device according to this example. This section has a different core material used therefor and has no electrode provided thereto as compared to the above-mentioned refractive index control section 3 illustrated in FIG. 5. It should be noted that the portions having the same names as those described with reference to FIG. 5 are denoted by the same reference numerals as those of FIG. 5, respectively.

The $SiO_2$ layer 32 was formed on the silicon substrate 31, and then an $SiO_2$ layer 371 was formed.

Next, the $SrTiO_3$ layer was formed as the cladding layer 141.

A $TiO_2$ layer was formed thereon as a first core layer 121.

Next, the $SrTiO_3$ layer (cladding layer 141) and the $TiO_2$ layer (first core layer 121) were etched by the ion milling method.

Next, the $SiO_2$ layers 372 and 373 were formed.

A $TiO_2$ layer 122 was formed as a second core layer. The $SrTiO_3$ layer was formed thereon as the upper cladding layer 142.

It should be noted that, in the above-mentioned manufacturing processes for the structure illustrated in FIG. 5 (refractive index control section 3) and the structure illustrated in FIG. 7 (optical waveguide section 4 of the ring-shaped optical waveguide 2 other than the refractive index control section 3), the $SiO_2$ layer 32, the cladding layer 141, and the upper cladding layer 142 were formed on the same silicon substrate 31 simultaneously, and the other layers such as the electrode layers were formed on the region of one of the structures with the region of another one of the structures masked.

When a CW light beam having a wavelength of 1.55 μm was input to the ring modulator thus manufactured and modulation was performed at 3 Vpp in a state in which a bias voltage of 3.5 V was applied, modulation of a high frequency of up to 10 GHz was possible. The extinction ratio at that time was 4 dB.

Further, the manufactured ring modulator was heated up to 60° C. and the similar measurement was performed. When modulation was performed at 3 Vpp in a state in which a bias voltage of 3 V was applied, modulation of a high frequency of up to 10 GHz was possible. The extinction ratio at that time was 3.5 dB.

As described above, in the optical device including the ring-shaped optical waveguide and the input/output optical waveguide, an electro-optic material having a large optical absorption was used for the core portion of the refractive index control section. Accordingly, a small-sized, high-speed optical modulator that was small in characteristic fluctuation induced by temperature and was driven at low voltage was successfully manufactured.

In this example, PLZT was used as the core material of the refractive index control section, but this invention is not limited thereto, and an electro-optic material such as lead zirconate titanate, barium titanate, strontium-doped barium titanate, or KTN may be used. Further, as the core material of the other section of the ring-shaped waveguide, a material for forming an optical waveguide, such as $PbMoO_4$, may be used instead of $TiO_2$.

Further, the use of the aerosol deposition method for forming a film of the electro-optic material for the refractive index control section facilitates manufacturing of the optical element of this invention on a substrate on which an optical element of another type, such as a laser device, an electro-optic converter, an opto-electric converter, an optical amplifier, an optical waveguide, or an optical filter, is formed in advance, or on a substrate on which an integrated circuit including electronic elements such as a CPU and a memory is formed in advance.

Such a manufacturing method is applicable in manufacturing various optical integrated devices including the optical device of this invention and another device or an integrated circuit.

INDUSTRIAL APPLICABILITY

As has been described above, the optical device according to this invention is applicable to the optical device used for optical communication, optical interconnection, optical storage, and the like, and also to the optical integrated device including the same, and the manufacturing method therefor.

This application claims priority from Japanese Patent Application No. 2008-064186, filed on Mar. 13, 2008, the entire disclosure of which is incorporated herein by reference.

The invention claimed is:

1. An optical device, comprising an optical waveguide having a resonance structure, wherein:
    a first section that constitutes at least part of the optical waveguide includes a core layer connected to a core layer of a second section of the optical waveguide, which joins with the first section along a light traveling direction; and
    a first optical material that forms at least part of the core layer of the first section, and a second optical material that forms at least part of the core layer of the second section have thermo-optic effects with their signs different from each other;
    wherein the first section comprises a refractive index control section operable to control a refractive index at a guided wavelength according to an electric control signal;
    wherein the refractive index control section comprises, as the first optical material, one of an electro optic material including lead zirconate titanate and a material including lanthanum-doped lead zirconate titanate; and
    wherein the first section and the second section are parts of a ring-shaped optical waveguide.

2. An optical device according to claim 1, wherein the second optical material comprises an inorganic optical material.

3. An optical device according to claim 1, wherein a waveguide of the first section and a waveguide of the second section have, at least in part, at least one pair of effective lengths, refractive indices, and structures, which are set to have a relation in which a fluctuation in resonant wavelength induced by a temperature change is compensated.

4. An optical device according to claim 1, wherein:
    the optical waveguide comprises a ring-shaped optical waveguide;
    the optical device further comprises an input/output optical waveguide; and
    the optical device uses a resonance characteristic of the ring-shaped optical waveguide.

5. An optical device according to claim 1, wherein:
    the refractive index control section comprises an electrode is capable of forming an electric field; and
    the optical device operates as an optical modulator or an optical switch for controlling a light beam by applying an electric signal to the electrode.

6. An optical integrated device, comprising:
    the optical device according to claim 1 as a first device; and
    a second optical device mounted on a substrate on which the first device is mounted.

7. An optical integrated device according to claim 6, wherein the second optical device comprises any one of a laser device, an electro-optic converter, an opto-electric converter, an optical amplifier, an optical switch, and an optical filter.

8. An optical integrated device, comprising on a substrate:
    the optical device according to claim 1; and
    an electronic circuit.

9. A manufacturing method for the optical device according to claim 1, comprising forming at least part of the refractive index control section by depositing an optical material by an aerosol deposition method.

* * * * *